US012664450B2

(12) United States Patent
Molteni et al.

(10) Patent No.: US 12,664,450 B2
(45) Date of Patent: Jun. 23, 2026

(54) REPLACING LAMBDA EXPRESSIONS IN A RETE NETWORK WITH CORRESPONDING CODE CLASSES

(71) Applicant: RED HAT, INC., Raleigh, NC (US)

(72) Inventors: Luca Molteni, Milan (IT); Francesco Nigro, Milan (IT)

(73) Assignee: Red Hat, Inc., Raleigh, NC (US)

( * ) Notice: Subject to any disclaimer, the term of this patent is extended or adjusted under 35 U.S.C. 154(b) by 649 days.

(21) Appl. No.: 17/971,945

(22) Filed: Oct. 24, 2022

(65) Prior Publication Data

US 2024/0135210 A1    Apr. 25, 2024
US 2024/0232666 A9    Jul. 11, 2024

(51) Int. Cl.
   *G06N 5/047*        (2023.01)
   *G06N 5/025*        (2023.01)

(52) U.S. Cl.
   CPC ............. *G06N 5/047* (2013.01); *G06N 5/025* (2013.01)

(58) Field of Classification Search
   None
   See application file for complete search history.

(56) References Cited

U.S. PATENT DOCUMENTS

| 5,835,771 | A | | 11/1998 | Veldhuizen | |
| 6,327,582 | B1 | * | 12/2001 | Worzel | G06F 8/30 |
| | | | | | 706/13 |
| 8,024,281 | B2 | * | 9/2011 | Proctor | G06N 5/025 |
| | | | | | 707/747 |
| 8,095,494 | B2 | | 1/2012 | Andrade et al. | |
| 8,135,576 | B2 | * | 3/2012 | Haley | G06F 40/30 |
| | | | | | 704/4 |
| 8,341,613 | B2 | | 12/2012 | Donohue et al. | |
| 9,286,570 | B2 | | 3/2016 | Proctor et al. | |
| 10,209,970 | B2 | * | 2/2019 | Goetz | G06F 8/43 |
| 10,992,604 | B1 | * | 4/2021 | Knas | H04L 51/04 |
| 2003/0236690 | A1 | | 12/2003 | Johnston-Watt et al. | |
| 2007/0044083 | A1 | * | 2/2007 | Meijer | G06F 8/312 |
| | | | | | 717/151 |

(Continued)

FOREIGN PATENT DOCUMENTS

CN        105095060 A      11/2015

OTHER PUBLICATIONS

Initialize Once, Start Fast: Application Initialization at Build Time; Wimmer et. al. (Year: 2019).*

(Continued)

*Primary Examiner* — Mandrita Brahmachari
(74) *Attorney, Agent, or Firm* — Kilpatrick Townsend & Stockton LLP

(57)        ABSTRACT

Lambda expressions in a Rete network class can be replaced with code classes according to some examples herein. In one particular example, a system can generate a Rete network based on a set of rules. The Rete network can include nodes corresponding to conditions defined in the set of rules. The system can generate a network class based on the Rete network, where the network class is source code that includes lambda expressions representing the conditions associated with the nodes. The system can also generate replacement classes based on the lambda expressions. The system can then generate a modified network class by replacing the lambda expressions with the replacement classes in the network class.

17 Claims, 5 Drawing Sheets

(56) References Cited

U.S. PATENT DOCUMENTS

| 2009/0063385 A1* | 3/2009 | Proctor | G06N 5/025 |
| | | | 706/48 |
| 2012/0271787 A1* | 10/2012 | Lee | G06N 5/025 |
| | | | 706/48 |
| 2014/0195473 A1* | 7/2014 | Citeau | G06N 5/025 |
| | | | 706/47 |
| 2014/0222433 A1* | 8/2014 | Govrin | G06Q 40/02 |
| | | | 704/260 |
| 2016/0092205 A1* | 3/2016 | Seovic | G06F 9/44521 |
| | | | 717/170 |
| 2022/0156616 A1* | 5/2022 | Molteni | G06N 5/022 |

OTHER PUBLICATIONS

Geng et al., "Use the Genetic Algorithm to Optimize the Alpha Network of the RETE Algorithm", https://ieeexplore.ieee.org/document/9390026, 2021; pp. 24-27.
U.S. Appl. No. 17/704,866.

* cited by examiner

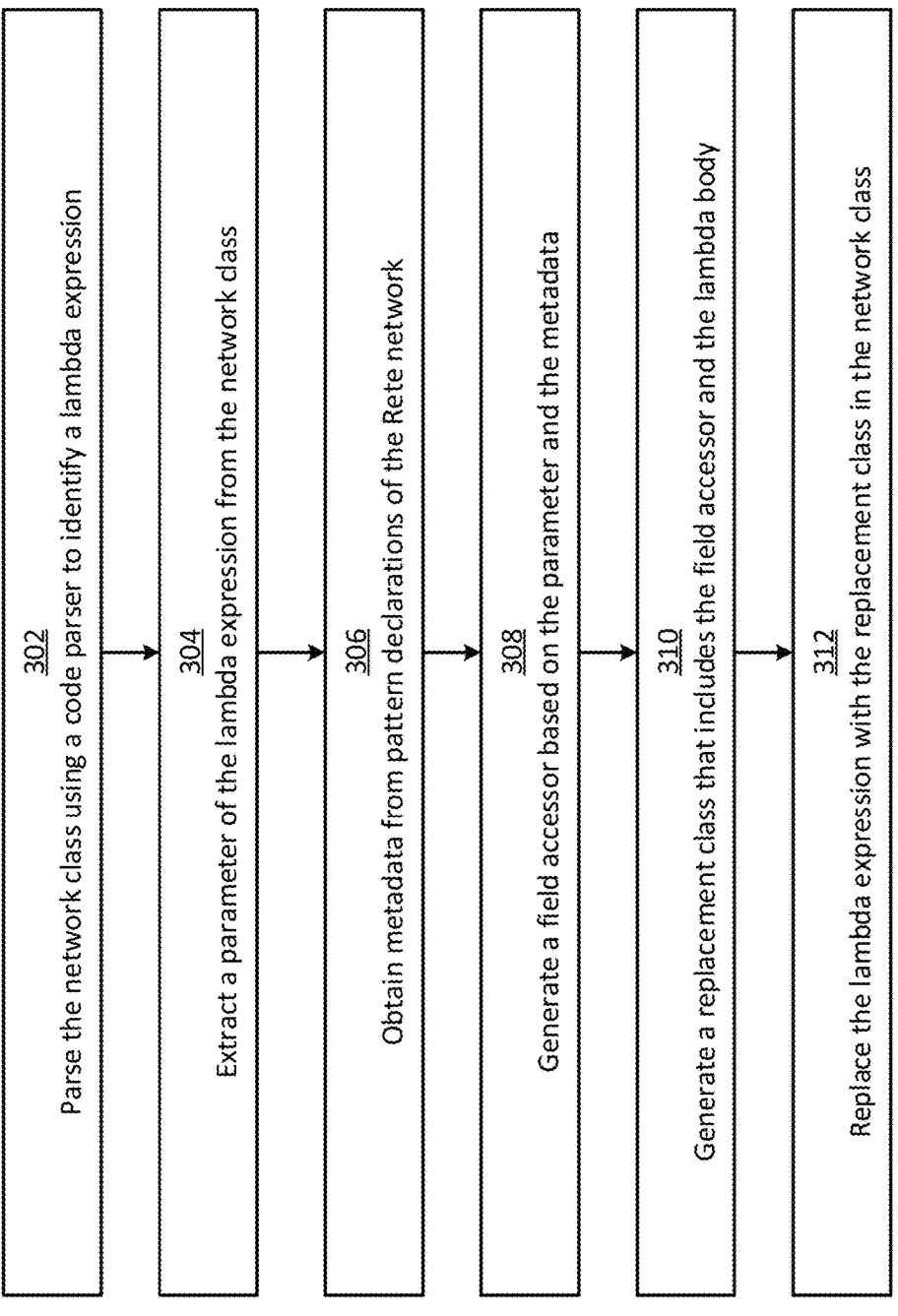

302

Parse the network class using a code parser to identify a lambda expression

304

Extract a parameter of the lambda expression from the network class

306

Obtain metadata from pattern declarations of the Rete network

308

Generate a field accessor based on the parameter and the metadata

310

Generate a replacement class that includes the field accessor and the lambda body

312

Replace the lambda expression with the replacement class in the network class

FIG. 3

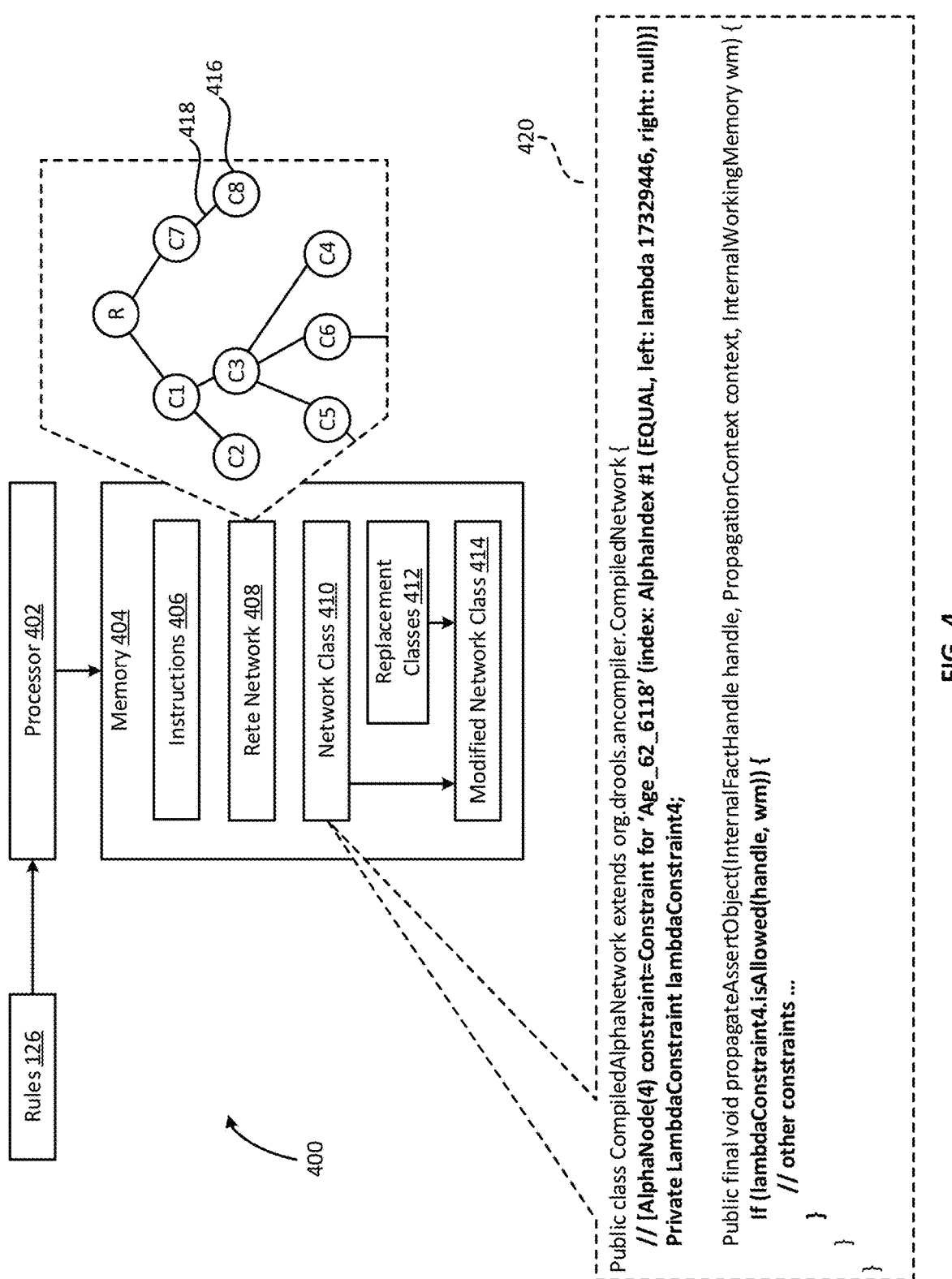

FIG. 4

```
Public class CompiledAlphaNetwork extends org.drools.ancompiler.CompiledNetwork {
    // [AlphaNode(4) constraint=Constraint for 'Age_62_6118' (index: AlphaIndex #1 (EQUAL, left: lambda 17329446, right: null))]
    Private LambdaConstraint lambdaConstraint4;

Public final void propagateAssertObject(InternalFactHandle handle, PropagationContext context, InternalWorkingMemory wm) {
        If (lambdaConstraint4.isAllowed(handle, wm)) {
            // other constraints ...
        }
    }
}
```

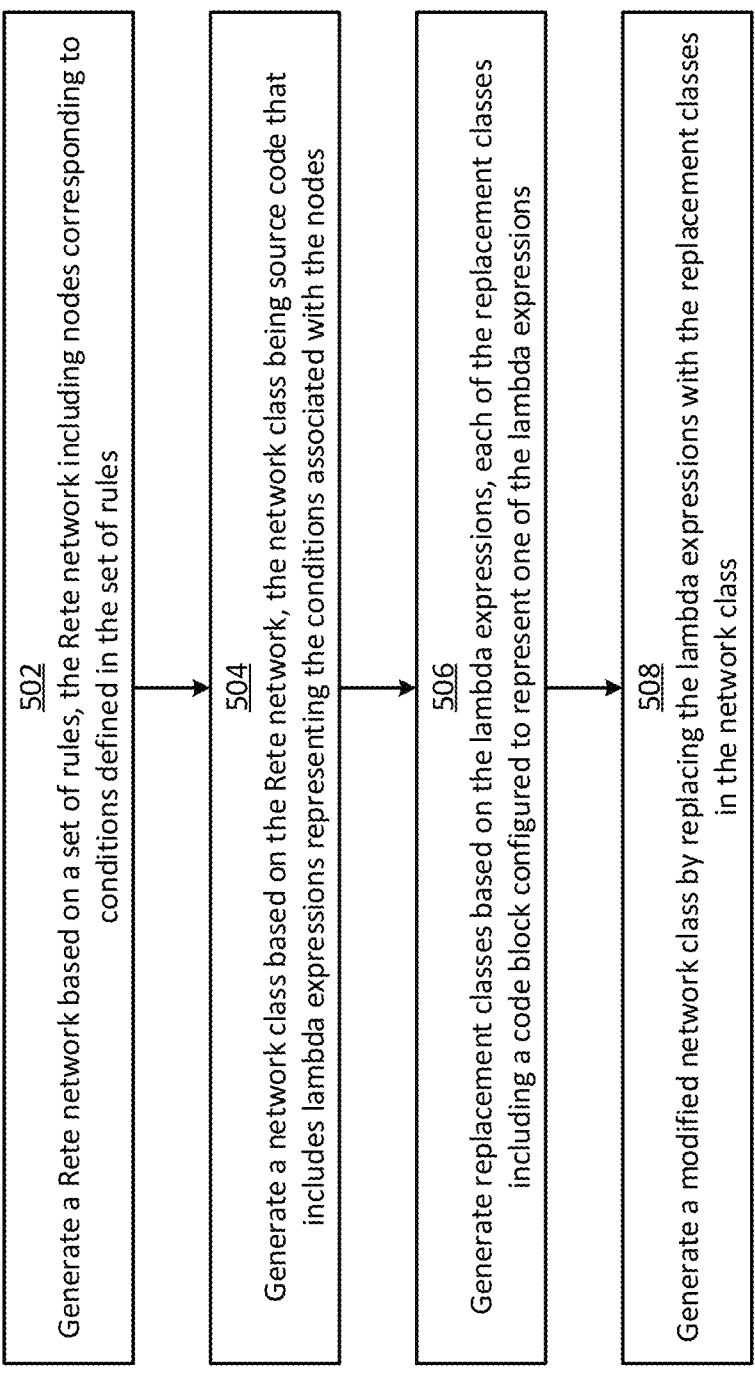

502

Generate a Rete network based on a set of rules, the Rete network including nodes corresponding to conditions defined in the set of rules

504

Generate a network class based on the Rete network, the network class being source code that includes lambda expressions representing the conditions associated with the nodes

506

Generate replacement classes based on the lambda expressions, each of the replacement classes including a code block configured to represent one of the lambda expressions

508

Generate a modified network class by replacing the lambda expressions with the replacement classes in the network class

FIG. 5

REPLACING LAMBDA EXPRESSIONS IN A RETE NETWORK WITH CORRESPONDING CODE CLASSES

TECHNICAL FIELD

The present disclosure relates generally to improving execution of a Rete network on a computer. More specifically, but not by way of limitation, this disclosure relates to replacing lambda expressions in a Rete network class with corresponding code classes, which can expedite the speed at which the network class can execute once compiled.

BACKGROUND

A rule engine is software that can process information by applying rules to data objects (also known as "facts"). A rule is a logical construct for describing operations, definitions, conditions, and/or constraints that apply to a data object. To process rules and data objects, a rule engine can implement a network. The network includes a tree of nodes that are interconnected. There are many different types of nodes, such as object-type nodes, alpha nodes, left-input-adapter nodes, eval nodes, join nodes, and terminal nodes.

One type of network used in rule engines is a Rete network. A Rete network uses a rooted acyclic direct graph where the nodes, with the exception of the root node, represent conditions. Paths from the root node to the leaf nodes represent left-hand sides of rules. Each node holds a list of data objects that satisfy an associated condition. A Rete algorithm keeps the information associated with the nodes up-to-date. When a data object is added to working memory, a token representing the data object is entered at the root of the Rete network and propagated to its leaves, modifying as appropriate the information associated with the nodes.

The first part of a Rete network can be an alpha network, which is a type of discrimination tree. The alpha network can include one or more branches of alpha nodes. The alpha network is responsible for selecting data objects by comparing attributes of the data objects against the conditions represented by the alpha nodes. If a data object is successfully matched against a condition represented by an alpha node in a branch, the data object is passed to the next alpha node in the branch. Each branch of alpha nodes can terminate at a memory, called an alpha memory. The alpha memory can store a collection of data objects that match each condition in each alpha node of the corresponding node branch. The collection of data objects in each alpha memory may then be propagated to a rule terminal node, which can interact with an agenda of the rule engine to list all of the rules that should be executed, along with the collection of responsible data objects.

BRIEF DESCRIPTION OF THE DRAWINGS

FIG. 3 shows a flow chart of an example of a process for generating a modified network class according to some aspects of the present disclosure.

FIG. 4 shows a block diagram of an example of a system for replacing lambda functions with code classes in a Rete network class according to some aspects of the present disclosure.

FIG. 5 shows a flow chart of an example of a process for replacing lambda functions with code classes in a Rete network class according to some aspects of the present disclosure.

DETAILED DESCRIPTION

A rule engine may generate a Rete network based on rules (e.g., business rules) input by a user. The rule engine can then evaluate the rules against data objects, for example by propagating each data object through an alpha network of the Rete network. This may involve evaluating each alpha node in the alpha network in sequence against each data object, which can be computationally slow and time consuming. To help expedite this process, in some examples a network code generator can be used to convert the alpha network into an object-oriented code representation of the alpha network, such as a class. For example, the network code generator can convert the alpha network into a Java class, which includes source code defining aspects of the alpha network. The class can be referred to as a network class (or a "Rete network class"), because it represents the alpha network of the Rete network.

Because the conditions expressed in the alpha nodes are subject to change, they may not be directly included in the network class. Rather, in some cases, the conditions may be expressed as lambda expressions in the network class. A lambda expression is a short function that accepts inputs and returns a value. The rule engine can evaluate the lambda expressions at runtime using a just-in-time (JIT) compiler. While the runtime evaluation of lambda expressions can improve flexibility, it can also dramatically slow down execution of the alpha network by requiring a significant amount of processing overhead.

Some examples of the present disclosure can reduce the abovementioned processing overhead by automatically replacing the lambda expressions in the network class with corresponding code classes (e.g., Java classes), which can be compiled into bytecode with the rest of the network class prior to runtime. The compiled bytecode can then be executed to implement the alpha network. Since the bytecode with the code classes has already been precompiled, it can execute faster than evaluating lambda expressions at runtime using a JIT compiler. This approach can also reduce processor overhead by avoiding computationally expensive JIT compilation.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
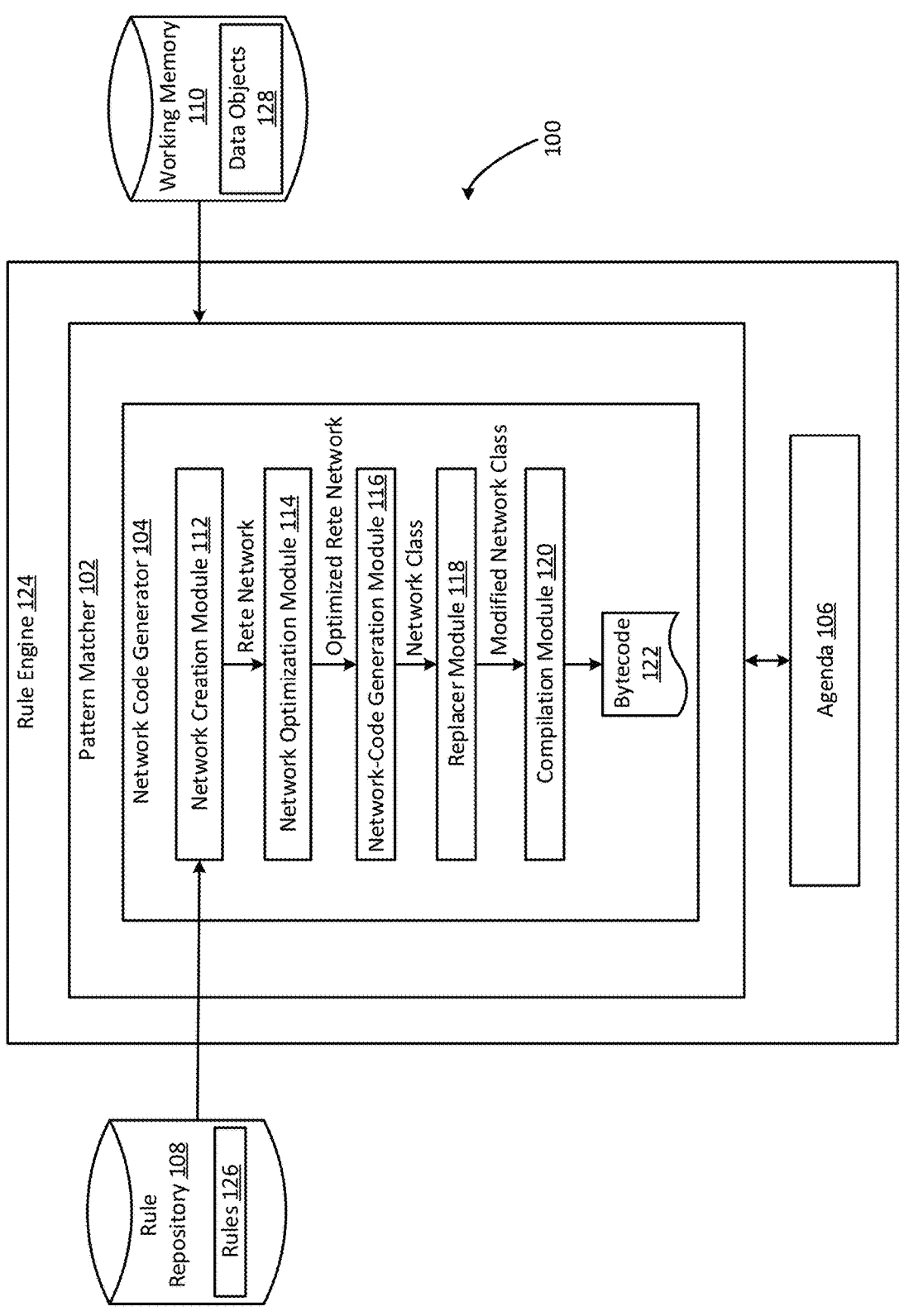
FIG. 1 shows a block diagram of an example of a system for replacing lambda functions with code classes in a Rete network class according to some aspects of the present disclosure.

FIG. 1 shows a block diagram of an example of a system for replacing lambda functions with code classes in a Rete network class according to some aspects of the present disclosure. The system 100 includes a rule engine 124, a working memory 110, and a rule repository 108. The rule repository 108 can include a predefined set of rules 126 usable to evaluate data objects (e.g., "facts"). The rule repository 108 can be any suitable type of data structure, such as a database of rules, a table of rules, etc. Each rule can have a lefthand side and a righthand side. The lefthand side can correspond to one or more constraints of the rule. The righthand side can correspond to one or more actions to be performed if the one or more constraints of the rule are satisfied. The working memory 110 can store data objects 128 that are to be matched against the rules 126. The data objects 128 can be added to the working memory 110 and removed from the working memory 110 by the rule engine 124, which is software executable on a computer.

The rule engine 124 can include a pattern matcher 102. The pattern matcher 102 can generate a Rete network based on the rules 126 stored in the rule repository 108. The Rete network can be created by linking together nodes. A majority of the nodes can correspond to conditions expressed in the rules 126. If multiple rules 126 have the same condition, a single node may be shared by the multiple rules 126. Once created, the Rete network can be used to evaluate the rules 126 from the rule repository 108 against the data objects 128 in the working memory 110. As the data objects propagate through the Rete network, the pattern matcher 102 can evaluate the data objects against the rules 126 (e.g., the constraints derived from the rules 126). Fully matched rules can result in activations, which are stored in the agenda 106. The agenda 106 can include a list of activations. Each activation can be a rule to be executed and a data object on which to execute the rule. The rule engine 124 can execute (e.g., "fire") the activations in any suitable order. For example, the rule engine 124 iterate through the agenda 135 to execute (or "fire") the activations sequentially or can execute the activations randomly.

In some examples, the system 100 can further include a network code generator 104. The network code generator 104 may be part of the rule engine 124 or separate from the rule engine 124. For example, the network code generator 104 can be part of the pattern matcher 102. The network code generator 104 can be configured to generate bytecode 122 corresponding to the Rete network, where the bytecode is executable to evaluate the Rete network against input data (e.g., data objects 128).

To generate the bytecode 122, the network code generator 104 can include several modules 112-120. It will be appreciated that although the modules 112-120 are shown in FIG. 1 as being separate from one another, this is intended to be illustrative and non-limiting. Any two or more of the modules 112-120 may be combined together into a single module that performs the functionality thereof. Each of the modules 112-120 will now be described below in turn.

As shown in FIG. 1, the network code generator 104 can include a network creation module 112 configured to generate at least part of a Rete network based on the rules 126. For example, the network creation module 112 can generate an alpha network based on the rules 126. The Rete network can be created by generating the nodes based on the rules 126 and linking the nodes together. A network optimization module 114 can receive the Rete network and generate an optimized Rete network by performing one or more optimizations on the original Rete network. For example, the network optimization module 114 can optimize the Rete network via hashing, alpha node sharing, indexing, etc. The optimized Rete network can then be passed on to the network-code generation module 116.

The network-code generation module 116 can generate a network class based on the optimized Rete network. The network class is a source code representation of at least part of the optimized Rete network, such as the alpha network of the optimized Rete network. The source code can be in any suitable programming language, such as Java or Python. The network class can be generated using one or more metaprogramming techniques. For example, the system 100 can include metaprogramming libraries usable to convert the optimized Rete network into the network class. The network class can indicate a sequence in which to evaluate the conditions associated with the nodes of the Rete network. The network class may also include lambda expressions corresponding to the nodes of the Rete network. In some cases, the lambda expressions in the network class may create a bottleneck when executing the Rete network. In some cases, the process of converting the optimized Rete network into the network class can be referred to as "compilation." It should be appreciated that this type of compilation is different from converting source code into bytecode, which is also sometimes referred to as compilation.

To help avoid the bottleneck mentioned above, the network code generator 104 can include a replacer module 118. The replacer module 118 can generate replacement classes that are configured to replace the lambda expressions with corresponding replacement classes. A replacement class is a class (e.g., a Java class) that corresponds to a lambda expression, where the class is configured to indicate the condition defined by the lambda expression. The class may be written in the same programming language as the network class. The replacer module 118 can replace one or more of the lambda expressions in the network class with the replacement classes to produce a modified network class. The replacer module 118 can also replace some or all of the original references to the lambda expressions in the modified network class with new references to the replacement classes. This can ensure that the replacement classes are called at the appropriate times. Additionally or alternatively, replacer module 118 can remove some or all of the references to the lambda expressions from the network class (e.g., so that the modified network class no longer involves lambda expressions). More details about the operations of the replacer module 118 are described later on with respect to FIG. 3.

After the modified network class has been generated, a compilation module 120 can compile the modified network class into the bytecode 122. For example, if the modified network class is Java code and the compilation module 120 includes a Java compiler, the compilation module 120 can compile the Java code into bytecode 122 for further execution.

Figure 2:
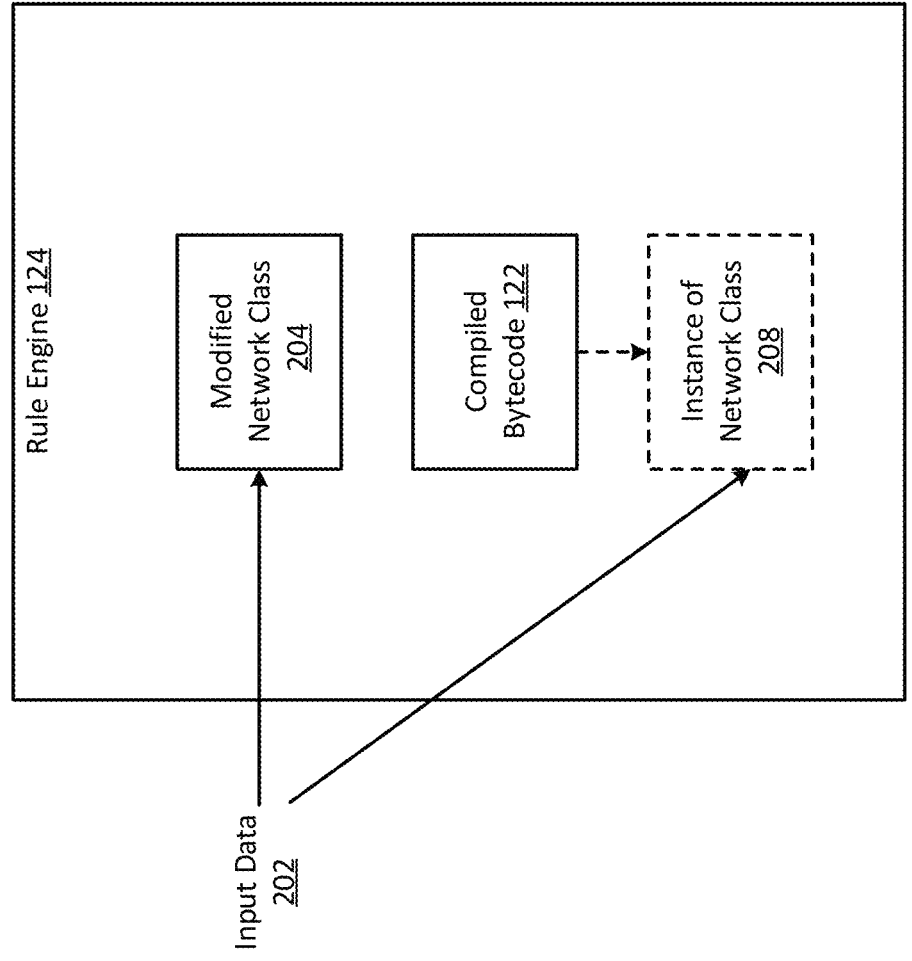
FIG. 2 shows an example of a process for executing compiled bytecode for a Rete network class according to some aspects of the present disclosure.

An example of a process for executing the bytecode 122 is shown in FIG. 2. As shown, the rule engine 124 can receive input data 202, such as a data object. The rule engine 124 can receive the input data 202 from working memory. The rule engine 124 can evaluate the input data 202 against the modified network class 204 to determine if they match. If they match, the rule engine 124 can generate an instance of the network class 208 by executing the compiled bytecode 122 associated with the modified network class 204. The rule engine 124 can then evaluate the input data 202 using the running instance of the network class 208.

FIG. 3 shows a flow chart of an example of a process for generating a modified network class according to some aspects of the present disclosure. Other examples may include more operations, fewer operations, different operations, or a different order of operations than is shown in FIG. 1. The operations of FIG. 3 are described below with reference to the components of FIG. 1.

In block 302, the replacer module 118 parses the network class using a code parser to identify a lambda expression. The lambda expression can represent a condition associated with a node of a Rete network. The code parser can be, for example, a software library configured to analyze the source code of the network class to identify the lambda expression. In some examples, the code parser can parse the network class to generate an abstract syntax tree (AST), which can then be traversed to find the lambda expression.

In block 304, the replacer module 118 extracts one or more parameters of the lambda expression from the network class. For example, each lambda expression may have a body and one or more parameters. The body can be what happens inside the Lambda expression, similar to the computations inside a function. A parameter can be an variable passed to the Lambda expression, similar to an argument passed to a function. For example, in the Lambda function "\x→x==2", the parameter can be "x" and the body can be "x==2." The one or more parameters can correspond to at least one condition (e.g., constraint) of the corresponding node in the Rete network.

In block 306, the replacer module 118 obtains field metadata associated with the Rete network. For example, the Rete network can include pattern declarations, and the pattern declarations can include the field metadata. A pattern declaration can be a declaration in a pattern match expression. The declaration can be in the left-hand side of the rule, and can indicate what kind of data object or property of a data object is used by the rule. For example, if the rule engine 124 is a Drools engine, given a rule with a left-hand side of "$p: Person ( )", the system will generate a $p declaration of type Person. The replacer module 118 can obtain the field metadata from the pattern declaration for use in subsequent operations. The field data can include the type of the declaration and all the related types, such as the type of the properties or the super types. While in the above example the field metadata was obtained from the pattern declaration, in other examples the field metadata may be obtained from other aspects of the Rete network.

In block 308, the replacer module 118 generates a field accessor based on the one or more parameters and the metadata. A field accessor can be source code (e.g., a method) configured to access an internal field of an object. As applied here, the field accessor can be source code configured to access one or more fields described in the field data. The field accessor can serve as an alternative to preexisting internal classes of the rule engine 124. For example, if the rule engine 124 is a Drools engine, the field accessor can be used to avoid using Drools' internal classes such as Declaration or ReadAccessor. This can help to decrease the coupling between the compiled Rete network (e.g., alpha network) and the Drools internal API.

In block 310, the replacer module 118 generates a replacement class that includes the field accessor. The replacement class can also include, in the replacement class, some or all of the lambda body (the body of the lambda expression). The replacement class can represent the condition associated with the original lambda expression.

In block 312, the replacer module 118 replaces the lambda expression with the replacement class in the network class. For example, the replacer module 118 can add (e.g., append) the replacement class to the network class. The replacer module 118 may also replace every instance of the lambda expression and/or every reference to the lambda expression with a call to the replacement class. This can help ensure that the replacement class is called at the appropriate times in the network class.

The above process can be repeated for any number of lambda expressions. Using these techniques, most of the indirections associated evaluating conditions of a Rete network can be removed. This can reduce the amount of time and overhead consumed by the JIT compiler and help decouple the network class from the internal API and built-in functions of the rule engine 124. These techniques can also lead to smaller bytecode and faster evaluation of the network class at runtime (e.g., the runtime evaluation described above with respect to FIG. 2).

FIG. 4 shows a block diagram of an example of a system 400 for replacing lambda functions with code classes in a Rete network class according to some aspects of the present disclosure. As shown, the system 400 includes a processor 402 communicatively coupled to a memory 404. The processor 402 and memory 404 can be integrated into a single housing or can be distributed from one another.

The processor 402 can include one processing device or multiple processing devices. Examples of the processor 402 include a Field-Programmable Gate Array (FPGA), an application-specific integrated circuit (ASIC), and a microprocessor. The processor 402 can execute instructions 406 stored in the memory 404 to perform operations. The instructions 406 may include processor-specific instructions generated by a compiler or an interpreter from code written in any suitable computer-programming language, such as C, C++, C #, and Java. In some examples, the instructions 406 can be configured to perform some or all of the functionality of the network code generator 104 of FIG. 1.

The memory 404 can include one memory device or multiple memory devices. The memory 404 can be volatile or non-volatile (e.g., it can retain stored information when powered off). Examples of the memory 404 include electrically erasable and programmable read-only memory (EEPROM), flash memory, or any other type of non-volatile memory. At least some of the memory 404 can include a non-transitory computer-readable medium from which the processor 402 can read instructions 406. A computer-readable medium can include electronic, optical, magnetic, or other storage devices capable of providing the processor 402 with computer-readable instructions or other program code. Examples of a computer-readable medium include magnetic disks, memory chips, ROM, random-access memory RAM, an ASIC, a configured processor, optical storage, or any other medium from which a computer processor can read the instructions 406.

In some examples, the processor 402 can execute the instructions 406 to perform operations. For example, the processor 402 can generate a Rete network 408 based on a set of rules 126. The Rete network 408 can include nodes 416 corresponding to conditions (e.g., C1-C8) defined in the set of rules 126. The nodes 416 can also include a root node, which is designated with an "R" in FIG. 4. The nodes can be interconnected via links 418.

Next, the processor 402 can generate a network class 410 based on the Rete network 408. An example of a portion of the network class 410 is shown in the dashed box 420. As shown, the network class 410 is source code that includes one or more lambda expressions representing the conditions associated with one or more of the nodes 416. Each lambda expression may represent one or more conditions associated with a single node. In the dashed box 420, aspects of the source code related to a lambda expression are shown in bold.

The processor 402 can also generate replacement classes 412 based on the lambda expressions. Each of the replacement classes can be configured to represent one of the lambda expressions. The processor 402 can generate each replacement class based on one or more parameters of the corresponding lambda expression. For example, the processor 402 can generate a field accessor based on one or more parameters of a corresponding lambda function. The processor 402 can then generate a replacement class 412 based on the field accessor. The processor 402 may also incorporate the body of the corresponding lambda function into the replacement class 412.

The processor 402 can generate a modified network class 414 by replacing the lambda expressions with the replacement classes 412 in the network class 410. The modified network class 414 can be configured to call the replacement classes 412 during execution to obtain the conditions associated with the nodes 416.

FIG. 5 shows a flow chart of an example of a process for replacing lambda functions with code classes in a Rete network class according to some aspects of the present disclosure. Other examples may include more operations, fewer operations, different operations, or a different order of operations than is shown in FIG. 5. The operations of FIG. 5 are described below with reference to the components of FIG. 4.

In block 502, a processor 402 generates a Rete network 408 based on a set of rules 126. The Rete network 408 can include nodes 416 corresponding to conditions (e.g., C1-C8) defined in the set of rules 126.

In block 504, the processor 402 generates a network class 410 based on the Rete network 408. The network class 410 is source code that includes lambda expressions representing the conditions associated with the nodes 416. The processor 402 can use metaprogramming techniques to generate the network class 410.

In block 506, the processor 402 generates replacement classes 412 based on the lambda expressions. Each of the replacement classes can be configured to represent one of the lambda expressions. For example, a single replacement class can represent a single lambda expression.

In block 508, the processor 402 generates a modified network class 414 by replacing the lambda expressions with the replacement classes 412 in the network class 410. Replacing a lambda expression with a replacement class 412 can involve replacing every existing reference to the lambda expression in the network class 410 with the replacement class 412 itself and/or a new reference to the replacement class 412. For example, the processor 402 can incorporate the replacement class 412 into the network class 410 and then replace all existing references to the lambda expression in the network class 410 with calls to the replacement class 412. The modified network class 414 can be stored in the same file as the original network class 410 or in a different file from the original network class 410.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A non-transitory computer-readable medium comprising program code that is executable by one or more processors for causing the one or more processors to perform operations including:

generating a Rete network based on a set of rules, the Rete network including nodes corresponding to conditions defined in the set of rules;

generating a network class based on the Rete network, the network class being source code that includes lambda expressions representing the conditions associated with the nodes;

generating replacement classes based on the lambda expressions, each of the replacement classes being configured to represent one of the lambda expressions, wherein generating the replacement classes involves:

parsing the network class to identify a lambda expression in the network class;

extracting a parameter of the lambda expression from the network class;

generating a field accessor based on the parameter; and generating a replacement class that includes the field accessor, the replacement class being one of the replacement classes;

generating a modified network class by replacing the lambda expressions with the replacement classes in the network class; and compiling the modified network class into bytecode, wherein a rule engine is configured to execute the compiled bytecode to evaluate input data against the Rete network.

2. The non-transitory computer-readable medium of claim 1, wherein generating the field accessor involves:

obtaining field metadata from one or more pattern declarations of the Rete network; and generating the field accessor based on the parameter and the field metadata.

3. The non-transitory computer-readable medium of claim 1, wherein the nodes are alpha nodes of an alpha network of the Rete network, the alpha network being a discrimination network configured to select working memory elements that match the conditions associated with the alpha nodes.

4. The non-transitory computer-readable medium of claim 1, wherein the operations further comprise receiving the set of rules as input from a user via a graphical user interface of the rule engine.

5. The non-transitory computer-readable medium of claim 1, wherein the operations further comprise generating the network class using one or more predefined metaprogramming libraries.

6. A method comprising:

generating, by one or more processors, a Rete network based on a set of rules, the Rete network including nodes corresponding to conditions defined in the set of rules;

generating, by the one or more processors, a network class based on the Rete network, the network class being source code that includes lambda expressions representing the conditions associated with the nodes;

prior to initiating compilation of the network class, generating, by the one or more processors, replacement classes based on the lambda expressions, each of the replacement classes being source code configured to represent one of the lambda expressions, wherein generating the replacement classes involves:

parsing the network class to identify a lambda expression in the network class;

extracting a parameter of the lambda expression from the network class; and generating a replacement class based on the parameter, the replacement class being one of the replacement classes;

prior to initiating compilation of the network class, modifying, by the one or more processors, the network class by replacing the lambda expressions with the replacement classes in the network class to thereby generate a modified network class; and after modifying the network class, compiling the modified network class into byte code, wherein the bytecode is executable by a rule engine to evaluate input data against the Rete Network.

7. The method of claim 6, wherein generating the replacement classes involves:

generating a field accessor based on the parameter; and generating the replacement class to include the field accessor.

8. The method of claim 7, wherein generating the field accessor involves:

obtaining field metadata from one or more pattern declarations of the Rete network; and generating the field accessor based on the parameter and the field metadata.

9. The method of claim 6, wherein the nodes are alpha nodes of an alpha network of the Rete network, the alpha network being a discrimination network configured to select working memory elements that match the conditions associated with the alpha nodes.

10. The method of claim 6, further comprising receiving the set of rules as input from a user via a graphical user interface of the rule engine.

11. The method of claim 6, further comprising generating the network class using one or more predefined metaprogramming libraries.

12. A system comprising:

one or more processors; and a memory that includes instructions executable by the one or more processors for causing the one or more processors to perform operations including:

generating a Rete network based on a set of rules, the Rete network including nodes corresponding to conditions defined in the set of rules;

generating a network class based on the Rete network, the network class being source code that includes lambda expressions representing the conditions associated with the nodes;

prior to initiating compilation of the network class, generating replacement classes based on the lambda expressions, each of the replacement classes being source code configured to represent one of the lambda expressions, wherein generating the replacement classes involves:

parsing the network class to identify a lambda expression in the network class;

extracting a parameter of the lambda expression from the network class; and generating a replacement class based on the parameter, the replacement class being one of the replacement classes;

prior to initiating compilation of the network class, modifying the network class by replacing the lambda expressions with the replacement classes in the network class to thereby generate a modified network class;

after modifying the network class, compiling the modified network class into bytecode; and executing, by a rule engine, the compiled bytecode to evaluate input data against the Rete network.

13. The system of claim 12, wherein generating the replacement classes involves:

generating a field accessor based on the parameter; and generating the replacement class to include the field accessor.

14. The system of claim 13, wherein generating the field accessor involves:

obtaining field metadata from one or more pattern declarations of the Rete network; and generating the field accessor based on the parameter and the field metadata.

15. The system of claim 12, wherein the nodes are alpha nodes of an alpha network of the Rete network, the alpha network being a discrimination network configured to select working memory elements that match the conditions associated with the alpha nodes.

16. The system of claim 12, wherein the operations further comprise generating the network class using one or more predefined metaprogramming libraries.

17. The system of claim 12, wherein modifying the network class involves:

identifying a reference to the lambda expression in the network class; and replacing the reference in the network class with a call to the replacement class.

* * * * *